(12) United States Patent
Shen et al.

(10) Patent No.: US 12,677,716 B1
(45) Date of Patent: Jul. 14, 2026

(54) PUNCHING TOOL AND AERATOR

(71) Applicant: SUZHOU MORANGE IMPORT & EXPORT CO., LTD., Suzhou (CN)

(72) Inventors: Zhangfan Shen, Suzhou (CN); Jingyun Liu, Suzhou (CN); Ruolin Jiang, Suzhou (CN); Ling Ju, Suzhou (CN); Xisong She, Suzhou (CN)

(73) Assignee: SUZHOU MORANGE IMPORT & EXPORT CO., LTD., Suzhou (CN)

( * ) Notice: Subject to any disclaimer, the term of this patent is extended or adjusted under 35 U.S.C. 154(b) by 9 days.

(21) Appl. No.: 19/317,098

(22) Filed: Sep. 2, 2025

(30) Foreign Application Priority Data

Jun. 23, 2025 (CN) .......................... 202510840887.3

(51) Int. Cl.
A01B 1/24 (2006.01)

(52) U.S. Cl.
CPC ................................... A01B 1/243 (2013.01)

(58) Field of Classification Search
CPC .............. A01B 1/243; A01B 1/24; A01B 1/00
See application file for complete search history.

(56) References Cited

U.S. PATENT DOCUMENTS

| | | | | |
|---|---|---|---|---|
| 1,951,061 | A | * 3/1934 | Orlow | A01B 1/243 111/200 |
| 5,014,791 | A | * 5/1991 | Kure | A01B 1/243 172/554 |
| 2007/0256845 | A1 | * 11/2007 | Catalano | A01B 1/243 172/21 |
| 2008/0128147 | A1 | * 6/2008 | Lynch | A01B 1/243 172/349 |

FOREIGN PATENT DOCUMENTS

| | | | | | |
|---|---|---|---|---|---|
| EP | 0635313 | A1 | * 1/1995 | ............. | B07B 1/155 |
| KR | 20060082042 | A | * 7/2006 | ............. | B60S 1/68 |
| RU | 2665077 | C1 | * 8/2018 | ............. | E01H 1/12 |
| SU | 1119818 | A | * 10/1984 | ............. | B23Q 3/00 |

* cited by examiner

*Primary Examiner* — Christopher J. Novosad
(74) *Attorney, Agent, or Firm* — SZDC Law PC

(57) ABSTRACT

A punching tool and an aerator are disclosed. A punching tool includes: a bracket; an execution body, rotatably connected to the bracket by a rotating shaft, where the execution body is provided with at least two arcuate panels that are disposed around the rotating shaft and are connected end-to-end, and the intersection point of normal lines of any two points on the at least two arcuate panels are respectively located at two sides of the rotating shaft; and a plurality of punching execution members, disposed on outer sides of the at least two arcuate panels. The punching execution members can be inserted into the ground more effectively, so that the contradiction between the effect and efficiency of punching of a conventional tool is solved, operations are simple and smooth, and manufacturing costs are low.

15 Claims, 18 Drawing Sheets

44

43

42

41

(a)

(b)

PUNCHING TOOL AND AERATOR

This application claims priority to Chinese Patent Application No. 2025108408873, filed on Jun. 23, 2025, which is incorporated by reference for all purposes as if fully set forth herein.

FIELD OF THE INVENTION

The present invention relates to the technical field of turf or lawn processing machinery, and in particular, to a punching tool and an aerator.

DESCRIPTION OF THE RELATED ART

In lawn maintenance, frequent trampling or mechanical compaction can lead to soil compaction, impairing root respiration and reducing water-nutrient use efficiency. Soil aeration is improved by mechanically punching the lawn to form holes with specific density, promoting water and nutrient infiltration, thereby facilitating healthy root growth in the lawn.

Existing technical approaches: The technical principles of existing solutions can be categorized into two types: The first type is solid-tine puncturing, which creates small-diameter, high-density holes in the lawn. The second type is hollow tubular puncturing, which extracts soil cores to form larger-diameter and sparser holes. This solution builds upon the first-type technical approach for tool innovation.

Existing tool solutions have a total of three types of commercially available mature products:

1. Handheld vertical nail plate. For example, Chinese Utility Model Patent (CN219555581U) discloses a hole puncher. The hole puncher includes: a punching assembly, the punching assembly including a fixing plate and a plurality of rows of punching nails mounted on the bottom face of the fixing plate, and each row including a plurality of punching nails; and a mounting body, the punching assembly being mounted on the mounting body. The mounting body is provided with a handheld portion. The handheld portion is designed for a user to hold while stepping to insert a nail plate into the ground during punching using the punching assembly. However, this hole puncher can only cover an area of approximately 0.03 m² (i.e., 10 cm×30 cm) per step, resulting in extremely low operational efficiency when dealing with large garden lawns.

2. Hand-pushed roller with nails. For example, U.S. Patent (US20090236107A1) discloses a grooming assembly, including a nail plate or a roller with nails. When pushing forward the grooming assembly, a user applies downward pressure or places a specific counterweight on the platform to insert the nails into the ground. The continuous rolling motion significantly enhances operational efficiency. However, when the foregoing grooming assembly uses an excessively light counterweight, the nails are inserted shallowly, leading to a suboptimal effect. When the counterweight is excessively heavy, the resistance in pushing is excessively large, leading to inconvenient use.

3. Strap-on spiked shoes. A spike plate attachable to footwear is used to insert spikes into the soil through a user's body weight during walking. However, it is difficult to lift the feet due to the excessive long spikes, and insecure fastening makes the product extremely prone to damage.

SUMMARY OF THE INVENTION

In view of the deficiencies in the related art, the present invention discloses a punching tool and an aerator.

The technical solution adopted in the present invention is as follows:

according to a first aspect, a punching tool is provided, including:

a bracket;

an execution body, rotatably connected to the bracket by a rotating shaft, where the execution body is provided with at least two arcuate panels that are disposed around the rotating shaft and are connected end-to-end, and the arc center of each of the arcuate panels and the arcuate panel are respectively located at two sides of the rotating shaft; specifically, an intersaction point of normal lines of any two points on the arcuate panel and the arcuate panel are respectively located at two sides of the rotating shaft; and a plurality of punching execution members, disposed on outer sides of the arcuate panels.

In an embodiment of the present invention, the execution body is provided with three arcuate panels that are disposed around the rotating shaft and are connected end-to-end; the execution body includes a group of side plates and a first panel, a second panel, and a third panel that are disposed between the group of side plates; and the first panel, the second panel, and the third panel are connected end-to-end.

In an embodiment of the present invention, the plurality of punching execution members are arranged on at least one arcuate panel based on preset positions; and the plurality of punching execution members have the same length or different lengths.

In an embodiment of the present invention, each arcuate panel is provided with a plurality of rows of punching execution members.

In an embodiment of the present invention, the plurality of rows of punching execution members are uniformly distributed at intervals on the surface of the arcuate panel.

In an embodiment of the present invention, in the plurality of rows of punching execution members, a spacing between two adjacent punching execution members close to the center of the arcuate panel is less than a spacing between a punching execution member close to an edge of the arcuate panel and a punching execution member adjacent thereto.

In an embodiment of the present invention, in a length direction of the arcuate panel, two end portions of the arcuate panel are not provided with the punching execution members.

In an embodiment of the present invention, adjacent punching execution members in the plurality of rows of punching execution members are alternately offset in a length or width direction of the arcuate panel.

In an embodiment of the present invention, each of the punching execution members extends from the arcuate panel in a direction away from the arcuate panel; and the punching execution member is provided with a tip protruding away from the panel.

In an embodiment of the present invention, a counterweight is provided inside the execution body.

According to a second aspect, an aerator is provided, including:

a mounting body, and the foregoing punching tool, connected to the mounting body.

In an embodiment of the present invention, the bracket is a support frame; the mounting body includes at least one connecting rod and a handheld member; the connecting rod connects the support frame and the handheld member; and the handheld member is disposed for a user to hold the handheld member when using the punching tool to perform punching.

In an embodiment of the present invention, the support frame includes a first connecting plate, a second connecting plate, and a third connecting plate; two sides of the third connecting plate are respectively connected to the first connecting plate and the second connecting plate; and the third connecting plate is connected to the connecting rod.

In an embodiment of the present invention, the support frame includes a group of first connecting arms, a group of second connecting arms, and a fourth connecting plate; each of the first connecting arms is connected to one second connecting arm in a bent manner to form a bent portion; two sides of the fourth connecting plate are respectively connected to the second connecting arms; the fourth connecting plate is connected to the connecting rod; when the connecting rod is perpendicular to a horizontal plane, each bent portion has a contact support point with the horizontal plane.

In an embodiment of the present invention, the handheld member includes a third connecting portion, a transition portion, a first handheld portion, a second handheld portion, and a third handheld portion; the third connecting portion is connected to the connecting rod; the first handheld portion is connected to the third connecting portion in a bent manner by the transition portion; and two sides of the second handheld portion are respectively connected to the first handheld portion and the third handheld portion, and the first handheld portion and the third handheld portion are disposed in parallel.

According to a third aspect, an aerator is provided, including:

a connecting frame; and at least one foregoing punching tool, mounted on the connecting frame.

In an embodiment of the present invention, the connecting frame is connected to a power apparatus.

Compared with the prior art, the foregoing technical solution of the present invention has the following advantages:

The punching tool of the present invention can insert the punching execution members into the ground more effectively, so that the contradiction between the effect and efficiency of punching of a conventional tool is solved, operations are simple and smooth, manufacturing costs are low, and the aeration of large-area lawns can be implemented.

The aerator of the present invention can enable a continuous and uniform aeration procedure, and is more suitable for the aeration needs of large-area lawns, thereby enhancing the operational efficiency of aerating large-area lawns.

BRIEF DESCRIPTION OF THE DRAWINGS

To make the content of the present invention clearer and more comprehensible, the present invention is further described in detail below with respect to specific embodiments of the present invention and with reference to the accompanying drawings.

Figure 1:
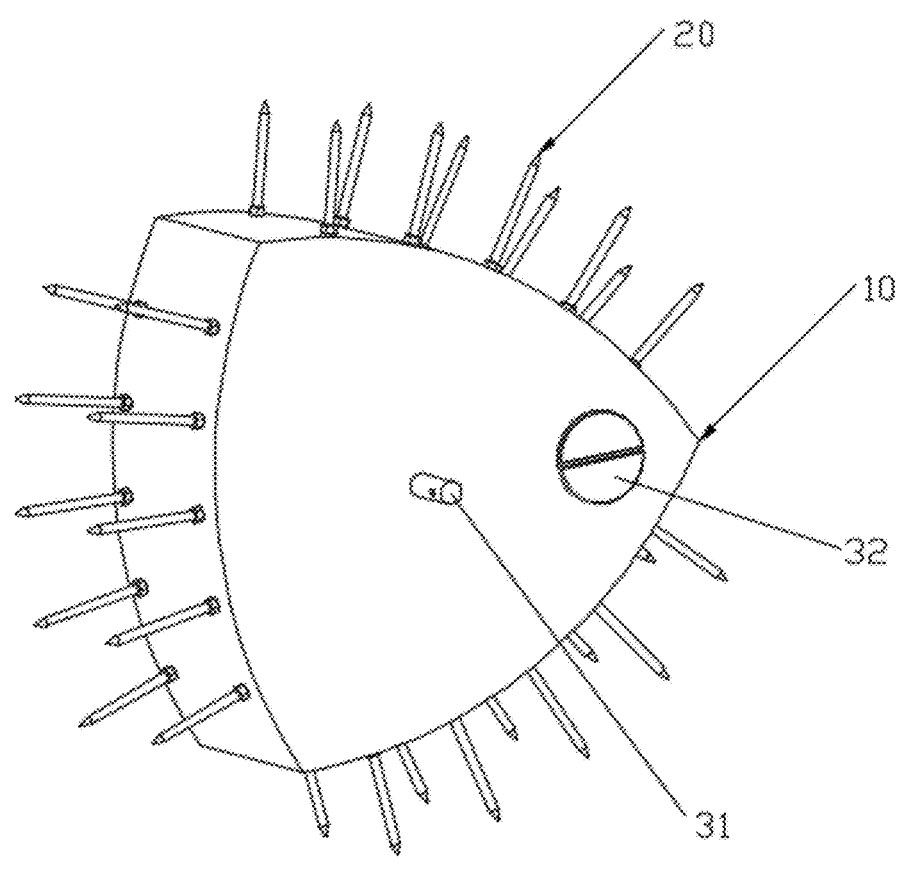
FIG. 1 is a schematic structural diagram of a punching tool from a first perspective according to Embodiment 1 of the present invention.
Figure 2:
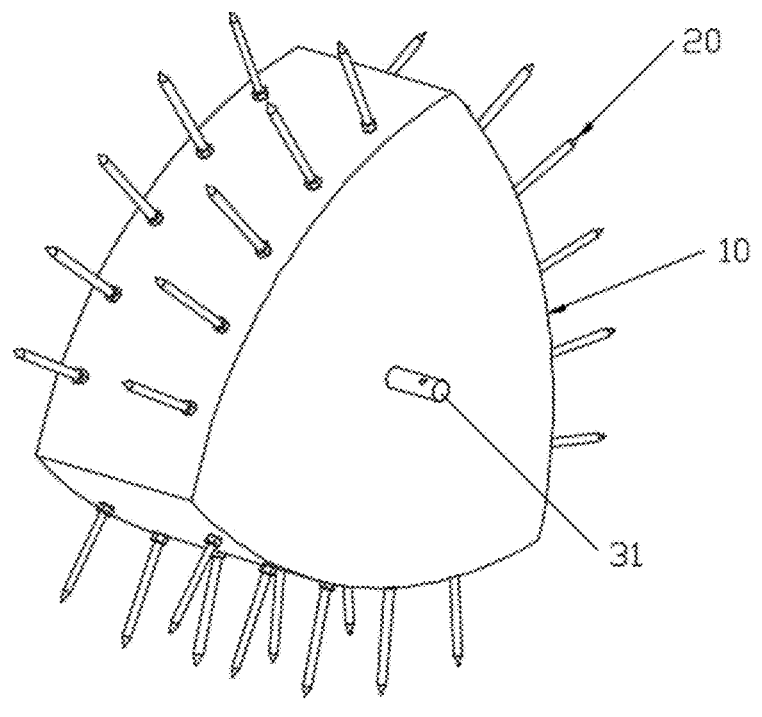
FIG. 2 is a schematic structural diagram of a punching tool from a second perspective according to Embodiment 1 of the present invention.

Reference numerals in the accompanying drawings of the specification:

10, execution body; 11, side plate; 12, extension plate; 13, fastening hole; 14, first panel; 15, second panel; 16, third panel;

20, punching execution member;

31, rotating shaft; 32, sealing cover; 33, bearing; 34, shim;

40, mounting body; 41, support frame; 411, first connecting plate; 412, second connecting plate; 413, third connecting plate; 414, diagonal brace; 415, first connecting arm; 416, bent portion; 417, second connecting arm; 418, fourth connecting plate; 42, first connecting rod; 421, connecting member; 422, first rod member; 43, second connecting rod; 431, first connecting portion; 432, second rod member; 433, second connecting portion; 44, handheld member; 441, third connecting portion; 442, transition portion; 443, first handheld portion; 444, second handheld portion; 445, third handheld portion; 446, extension portion; 447, handle portion; 448, fourth handheld portion;

50, first connecting frame;

60, second connecting frame; and 70, walking member.

DETAILED DESCRIPTION OF THE
PREFERRED EMBODIMENTS

The present invention is further described below with reference to the accompanying drawings and specific embodiments, to enable a person skilled in the art to better understand and implement the present invention. However, the embodiments are not used to limit the present invention.

The foregoing and other technical content, features, and effects of the present invention will be clearly presented in the following detailed description of the embodiments with reference to the accompanying drawings. The terms of directions such as up, down, left, right, front or back mentioned in the following embodiments are only the directions with reference to the accompanying drawings. Accordingly, the directional terms used are for illustration purposes and are not intended to limit the present invention, and furthermore, reference numerals in the same accompanying drawing denote the same elements in all of the embodiments.

Embodiment 1

Figure 3:
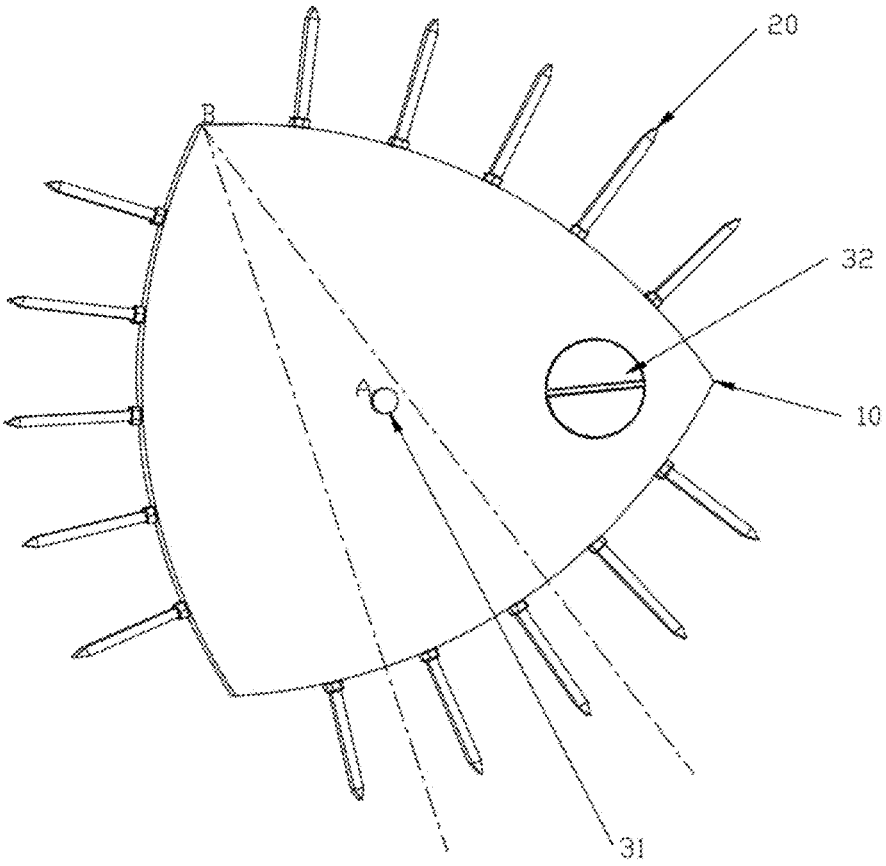
FIG. 3 is a front view of a punching tool according to Embodiment 1 of the present invention.

With reference to FIG. 1 and FIG. 3, a punching tool includes a bracket, an execution body 10, and a plurality of punching execution members 20.

Figure 5:
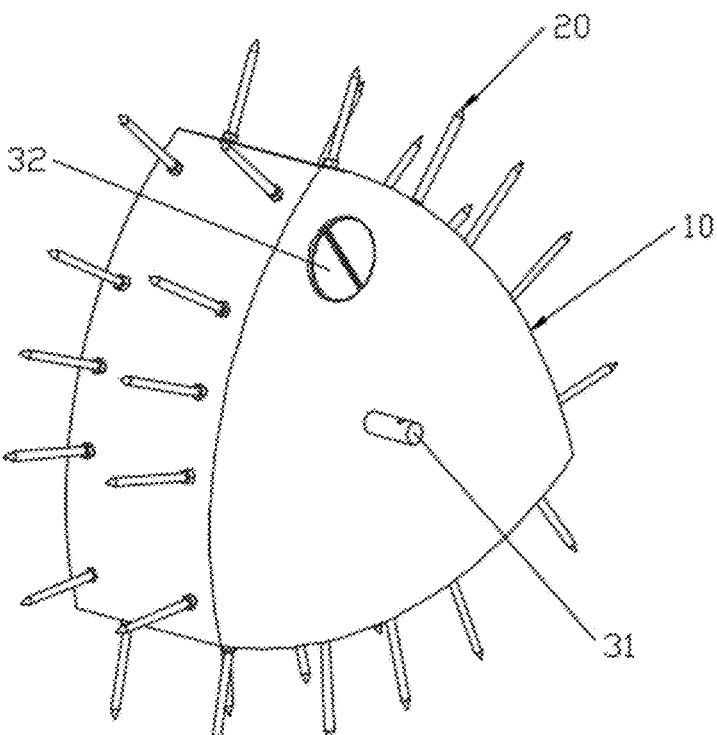
FIG. 5 is a schematic structural diagram of a punching tool according to Embodiment 3 of the present invention.
Figure 6:
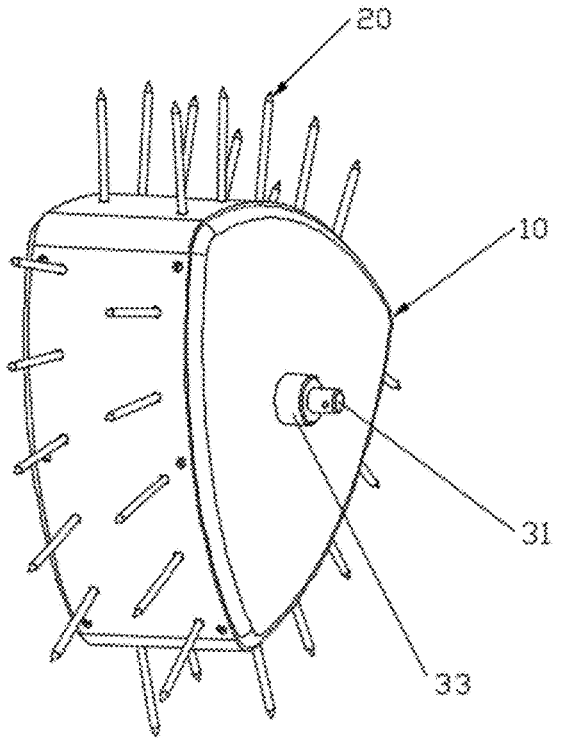
FIG. 6 is a schematic structural diagram of a punching tool according to Embodiment 4 of the present invention.

The execution body 10 is rotatably connected to the bracket by a rotating shaft 31. The execution body 10 is provided with three arcuate panels that are disposed around the rotating shaft 31 and are connected end-to-end. With reference to FIG. 5 and FIG. 6, the execution body 10 includes a group of side plates 11 and a first panel 14, a second panel 15, and a third panel 16 that are disposed between the group of side plates 11. The first panel 14, the second panel 15, and the third panel 16 are connected end-to-end, and edges of the first panel 14, the second panel 15, and the third panel 16 that face a horizontal plane are arcuate.

Further, in consideration of subsequently assembling the side plates 11, the first panel 14, the second panel 15, and the third panel 16, an extension plate 12 is connected to each side plate 11 in a bent manner. The side plate 11 and the extension plate 12 may be integrally formed or connected through welding or in another connection manner. The first panel 14, the second panel 15, and the third panel 16 may be integrally formed or connected through welding or in another connection manner. At least one fastening hole 13 is opened in each of the extension plates 12, the first panel 14, the second panel 15, and the third panel 16. During assembly into the execution body 10, the extension plates 12 extend into the first panel 14, the second panel 15, and the third panel 16, and the side plates 11 and the panels are correspondingly connected by passing screws or other fastening members through the fastening holes 13.

Alternatively, the side plates 11, the first panel 14, the second panel 15, and the third panel 16 are welded to form the execution body 10.

Figure 4:
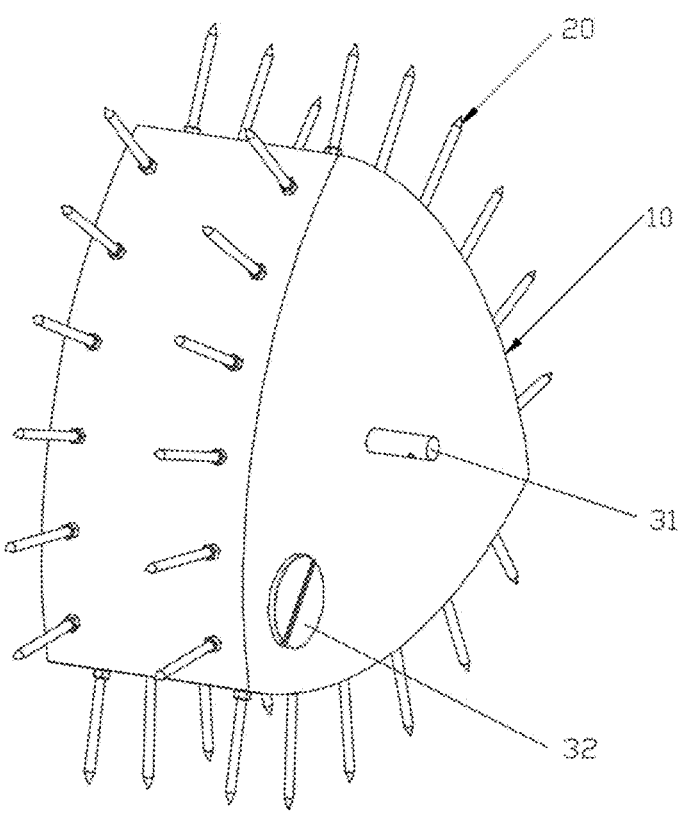
FIG. 4 is a schematic structural diagram of a punching tool according to Embodiment 2 of the present invention.

The plurality of punching execution members 20 are disposed on outer sides of the arcuate panels. Specifically, two rows of punching execution members 20 are provided on each of the first panel 14, the second panel 15, and the third panel 16. The two rows of punching execution members 20 are uniformly distributed at intervals on the surface of each arcuate panel. For example, with reference to FIG. 4 and (a) of FIG. 18, twelve punching execution members 20 are disposed on each arcuate panel in a 2×6 matrix form. Each punching execution member 20 has a length of 50 mm or 60 mm. The punching execution member 20 has a diameter ranging from 4 mm to 6 mm.

Each of the punching execution members 20 extends from the arcuate panel in a direction away from the arcuate panel. The punching execution member 20 is provided with a tip protruding away from the panel. For example, the punching execution member 20 may use an iron nail, which is directly fastened on the arcuate panel by a nut to form a detachable connection manner.

It should be noted that the plurality of punching execution members 20 have the same length or different lengths. A plurality of punching execution members 20 are disposed on each arcuate panel in an M×N matrix form, where M≥2, and N≥2.

Further, a counterweight is provided inside the execution body 10. The counterweight may use yellow sand or pebbles. To make it convenient for a user to change the weight of the counterweight, a hole may be opened in the execution body 10, and a sealing cover 32 is configured.

Further, a bearing 33 and a shim 34 are provided at a connection between the rotating shaft 31 and the bracket. The bearing 33 can withstand radial and axial loads, thereby ensuring that the rotating shaft 31 remains stable during rotation. The shim 34 may adjust the clearance between the bearing 33 and the bracket, thereby ensuring that the bearing 33 operates under appropriate preload.

Embodiment 2

Based on Embodiment 1, a difference lies in the arrangement of the punching execution members 20.

Figure 18:
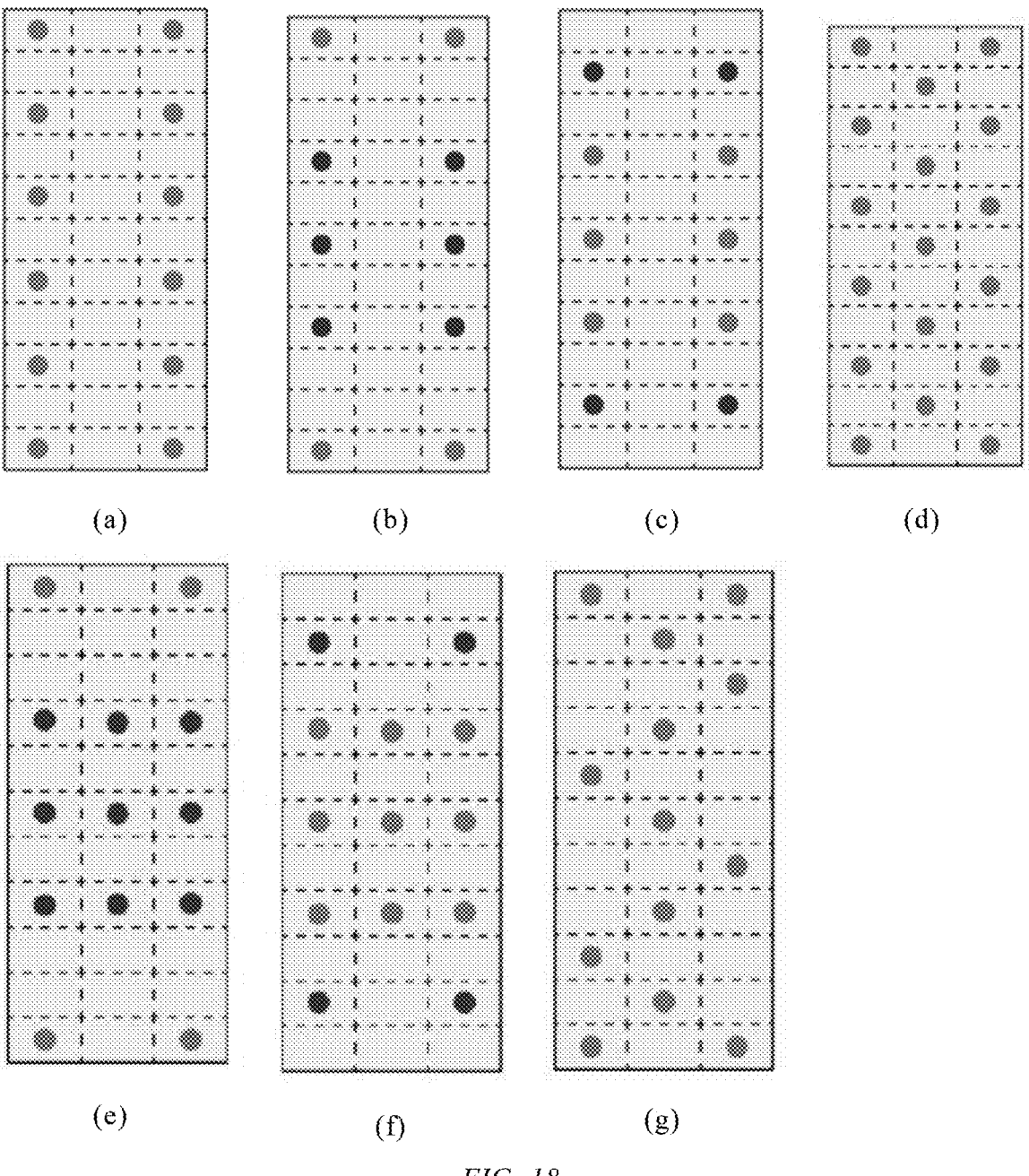
FIG. 18 is a schematic diagram of an arrangement manner of punching execution members according to the present invention.

Specifically, with reference to FIG. 5 and (b) of FIG. 18, in the two rows of punching execution members 20, a spacing between two adjacent punching execution members 20 close to the center of the arcuate panel is less than a spacing between a punching execution member 20 close to an edge of the arcuate panel and a punching execution member 20 adjacent thereto. It may be understood that compared with Embodiment 1, the positions of the punching execution members 20 close to the edge of the arcuate panel remain unchanged, and a plurality of punching execution members 20 close to the center of the arcuate panel are arranged closer to each other at intervals.

Embodiment 3

Based on Embodiment 1, a difference lies in the arrangement of the punching execution members 20.

Specifically, as shown in (c) of FIG. 18, in a length direction of the arcuate panel, two end portions of the arcuate panel are not provided with the punching execution members 20. It may be understood that compared with Embodiment 1, the positions of the punching execution members 20 close to the edge of the arcuate panel are changed to be closer to the center of the arcuate panel, and the positions of punching execution members 20 close to the center of the arcuate panel remain unchanged.

Embodiment 4

Based on Embodiment 1, a difference lies in the arrangement of the punching execution members 20.

Figure 7:
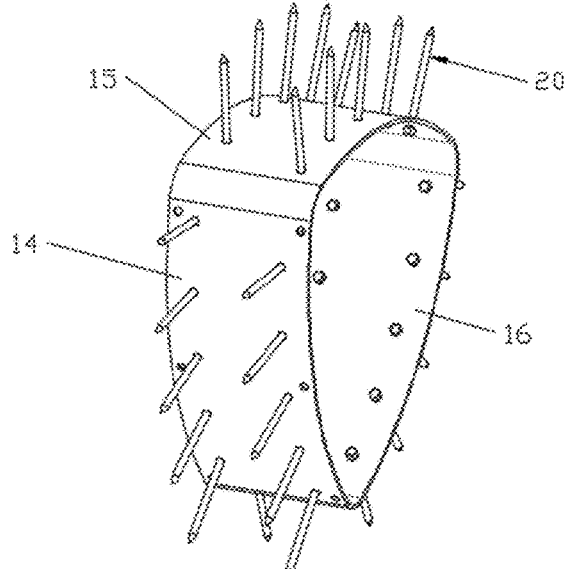
FIG. 7 is an exploded view of a punching assembly in FIG. 6.
Figure 7:
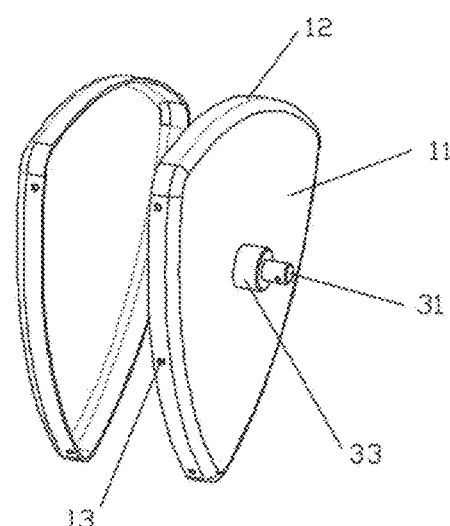

Specifically, with reference to FIG. 6 and FIG. 7, adjacent punching execution members 20 in the punching execution members 20 are alternately offset in a length or width direction of the arcuate panel. It may be understood that the plurality of punching execution members 20 are arranged in a zigzag pattern.

Embodiment 5

Based on Embodiment 1, a difference lies in that as shown in FIG. 18 (*d*), three rows of punching execution members 20 are provided on each of the first panel 14, the second panel 15, and the third panel 16.

Embodiment 6

Based on Embodiment 2, a difference lies in that as shown in FIG. 18 (e), three rows of punching execution members 20 are provided on each of the first panel 14, the second panel 15, and the third panel 16.

Embodiment 7

Based on Embodiment 3, a difference lies in that as shown in FIG. 18 (f), three rows of punching execution members 20 are provided on each of the first panel 14, the second panel 15, and the third panel 16.

Embodiment 8

Based on Embodiment 4, a difference lies in that as shown in FIG. 18 (g), three rows of punching execution members 20 are provided on each of the first panel 14, the second panel 15, and the third panel 16.

It should be noted that Embodiment 1 to Embodiment 8 are all described by using an example in which the execution body 10 is provided with three arcuate panels that are disposed around the rotating shaft 31 and connected end-to-end. The execution body 10 may alternatively be a variable-curvature ellipse or a polygon with a cross-section formed by circular arcs. The execution body is provided with at least two arcuate panels that are disposed around the rotating shaft 31 and are connected end-to-end, and the arc center of the arcuate panel and the arcuate panel are respectively located at two sides of the rotating shaft 31. That is, the intersaction point (as shown in point B in FIG. 3) of normal lines of any two points on the arcuate panel and the arcuate panel are respectively located at two sides of the rotating shaft 31 (as shown in point A in FIG. 3).

Embodiment 9

Figure 8:
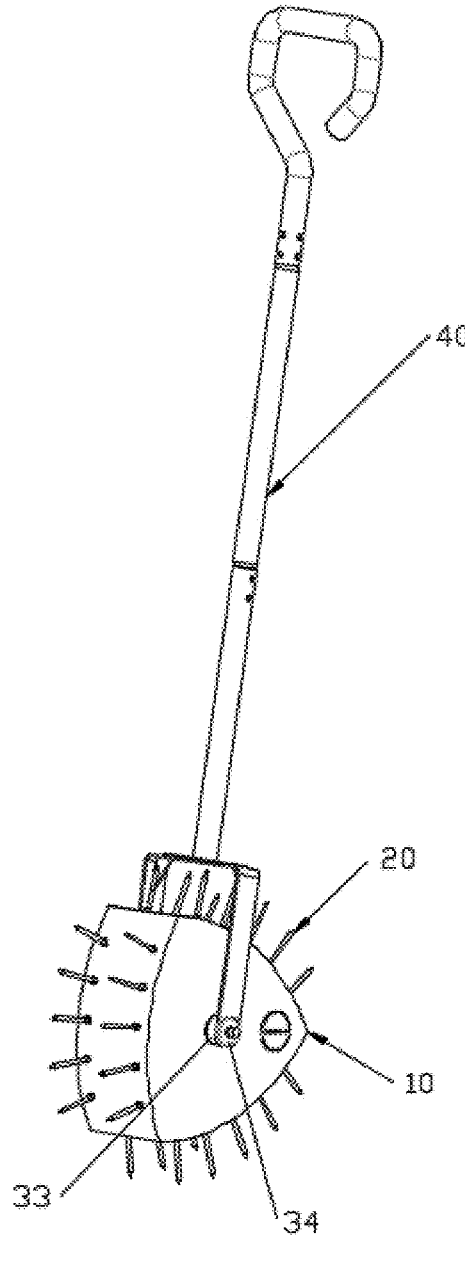
FIG. 8 is a schematic structural diagram of an aerator according to Embodiment 9 of the present invention.
Figure 9:
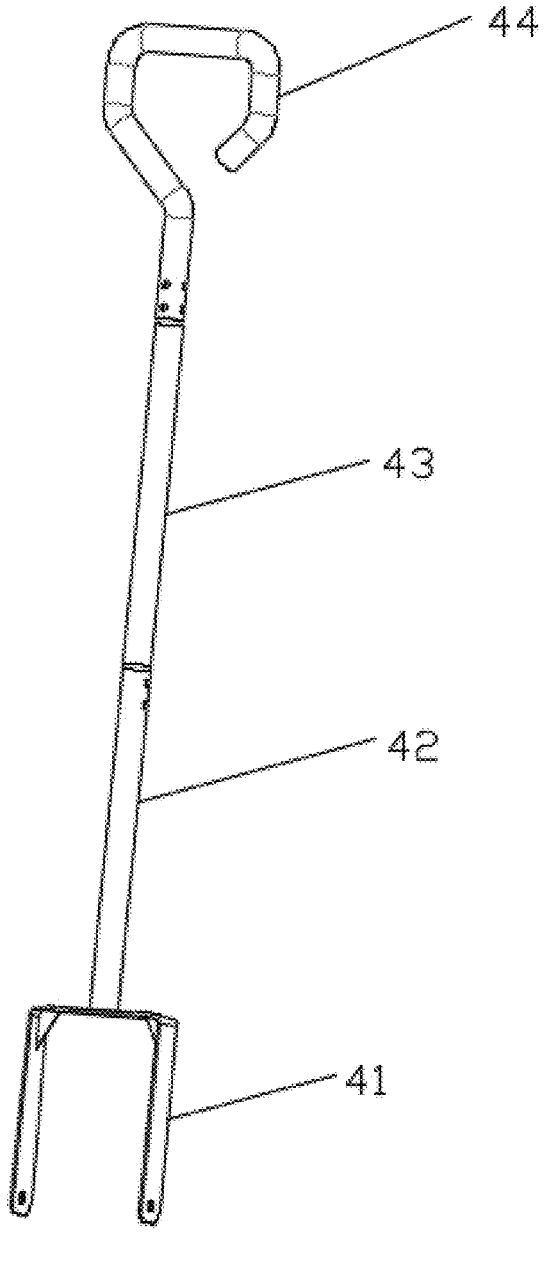
FIG. 9 is a schematic structural diagram of a mounting body in FIG. 8.
Figure 10:
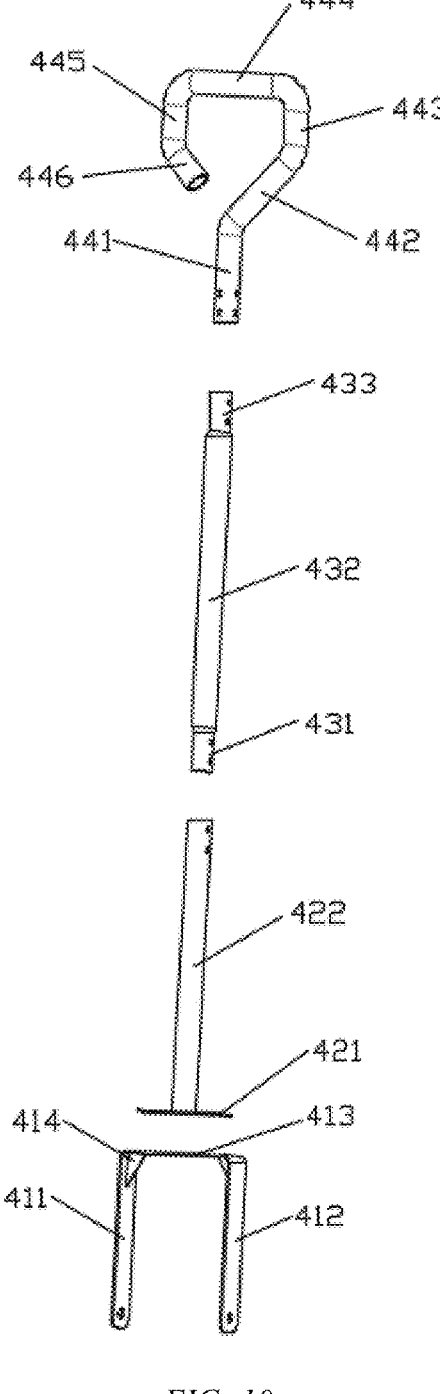
FIG. 10 is an exploded view of a mounting body in FIG. 8.

With reference to FIG. 8 to FIG. 10, an aerator includes a mounting body 40 and the punching tool provided in any one of Embodiment 1 to Embodiment 8. The punching tool is connected to the mounting body 40.

The bracket is a support frame 41. The mounting body 40 includes at least one connecting rod and a handheld member 44. The connecting rod connects the support frame 41 and the handheld member 44. The handheld member 44 is disposed for a user to hold the handheld member 44 when using the punching tool to perform punching. Specifically, this embodiment uses a segmented design. To be specific, two connecting rods, namely, a first connecting rod 42 and a second connecting rod 43, are disposed. After the first connecting rod 42 and the second connecting rod 43 are detached, the length is reduced by more than 50% to adapt to standard logistics packaging.

The first connecting rod 42 includes a connecting member 421 and a first rod member 422. The connecting member 421 is provided at an end portion of the first rod member 422. The connecting member 421 increases a contact area between the first connecting rod 42 and the support frame 41, so that the support frame 41 and the first connecting rod 42 are better fixedly connected.

The second connecting rod 43 includes a second rod member 432. The diameters at two ends of the second rod member 432 are both smaller than the diameter of the body thereof, so that a first connecting portion 431 and a second connecting portion 433 are formed. The first connecting portion 431 and the first connecting rod 42 are inserted, and the second connecting portion 433 and a third connecting portion 441 are inserted. Subsequently, fixed connection may be implemented through a bolt.

The handheld member 44 includes a third connecting portion 441, a transition portion 442, a first handheld portion 443, a second handheld portion 444, and a third handheld portion 445. The third connecting portion 441 is connected to the connecting rod. The first handheld portion 443 is connected to the third connecting portion 441 in a bent manner by the transition portion 442. Two sides of the second handheld portion 444 are respectively connected to the first handheld portion 443 and the third handheld portion 445. The first handheld portion 443 and the third handheld portion 445 are disposed in parallel.

The contour of the handheld member 44 is pentagonal, thereby meeting personalized holding habit of users. It may be selected according to user habit to mount the handheld member 44 in parallel or perpendicular to the rotating shaft 31 of the punching tool. Perpendicular mounting facilitates holding of the second handheld portion 444 by a user with one hand for use. Parallel mounting facilitates holding of the first handheld portion 443 and the third handheld portion 445 by a user with both hands for use.

Further, the connecting rod is connected to the support frame 41 and handheld member 44 by bolts and nuts to form the mounting body 40.

The support frame 41 includes a first connecting plate 411, a second connecting plate 412, and a third connecting plate 413. Two sides of the third connecting plate 413 are respectively connected to the first connecting plate 411 and the second connecting plate 412. The third connecting plate 413 is connected to the first connecting rod 42.

Further, to improve the structural stability and rigidity of the support frame 41, a diagonal brace 414 is provided at each of a connection between the first connecting plate 411 and the third connecting plate 413 and a connection between the second connecting plate 412 and the third connecting plate 413.

Further, to facilitate holding of the first handheld portion 443 and the third handheld portion 445 by the user with both hands for use, the third handheld portion 445 is provided with an extension portion 446, so that the hands of the user may be at least partially placed at the extension portion 446.

The operating principle of the present invention is as follows:

A force of pushing by the user holding the handheld member 44 is conducted to the punching tool. As the punching tool rotates, the punching execution members 20 generate differential cutting angles due to curvature variations, so that jamming caused by formation of triangular areas between the punching execution members 20 and soil surface in hard soil can be reduced, thereby improving the consistency of penetration depth, and improving the smoothness of the use procedure.

Embodiment 10

Based on Embodiment 9, a difference lies in the structural form of the support frame 41.

Figure 11:
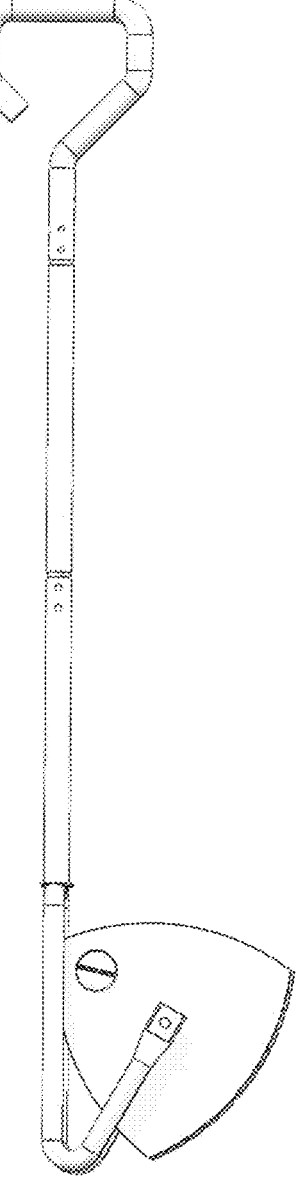
FIG. 11 is a schematic structural diagram of an aerator (punching execution members not shown) according to Embodiment 10 of the present invention.
Figure 12:
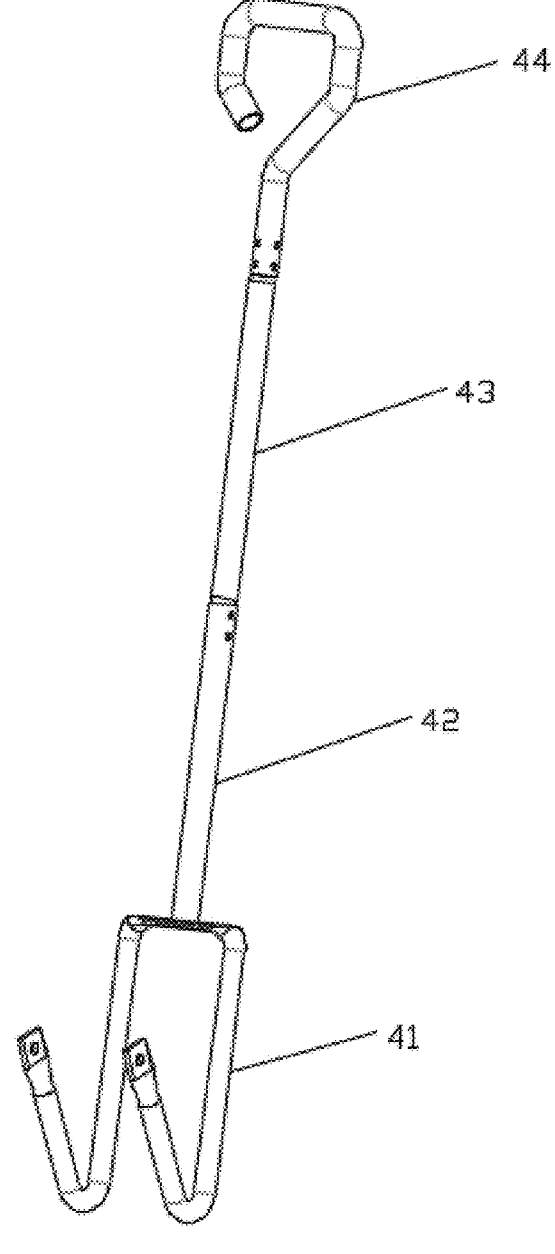
FIG. 12 is a schematic structural diagram of a mounting body in FIG. 11.

With reference to FIG. 11 and FIG. 12, the support frame 41 includes a group of first connecting arms 415, a group of second connecting arms 417, and a fourth connecting plate 418. Each of the first connecting arms 415 is connected to one second connecting arm 417 in a bent manner to form a bent portion 416. Two sides of the fourth connecting plate 418 are respectively connected to the second connecting arms 417. The fourth connecting plate 418 is connected to the connecting rod. When the connecting rod is perpendicular to a horizontal plane, each bent portion 416 has a contact support point with the horizontal plane.

Further, the angle of the bent portion 416 ranges from 90° to 150°, so that the punching tool assembled with the punching execution members 20 can rotate unimpeded. When the connecting rod is perpendicular to the ground, the support point of the support frame 41 and the lowest point of the punching tool are at the same horizontal height.

Figure 13:
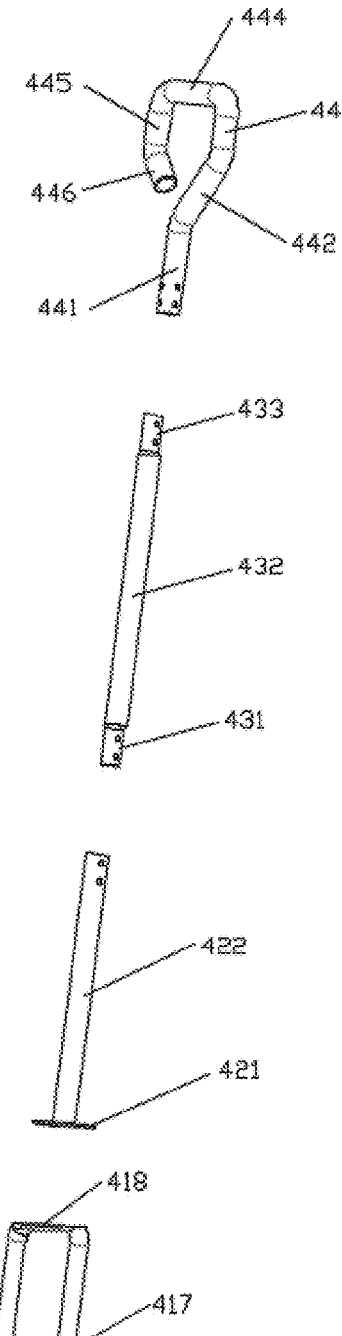
FIG. 13 is an exploded view of a mounting body in FIG. 11.
Figure 14:
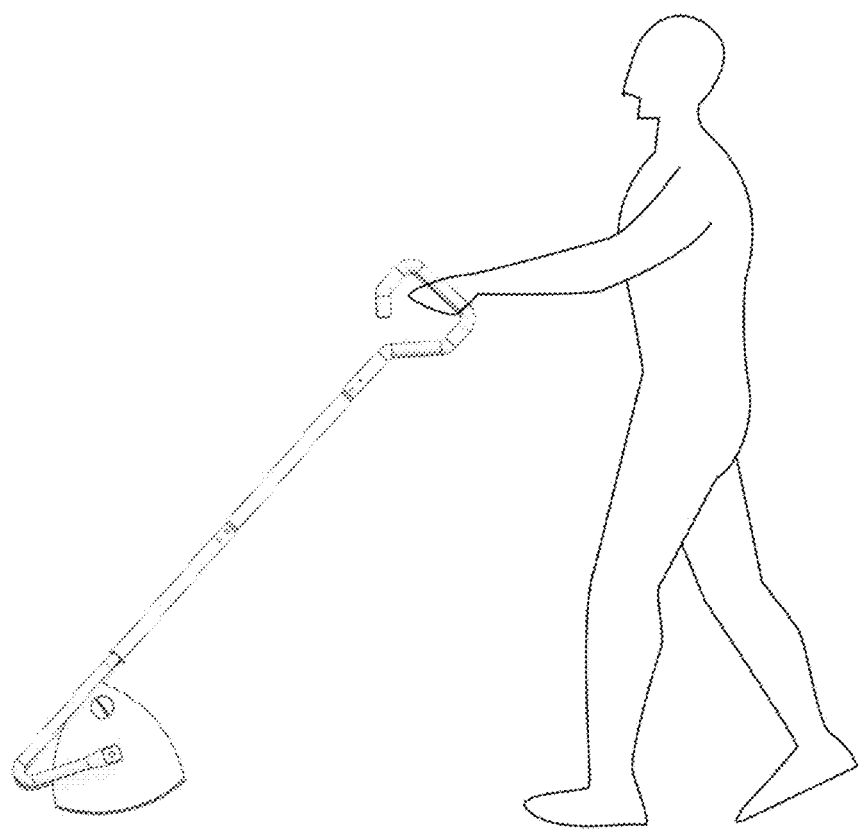
FIG. 14 is a schematic diagram of a first use state of the aerator (punching execution members not shown) according to Embodiment 10 of the present invention.
Figure 15:
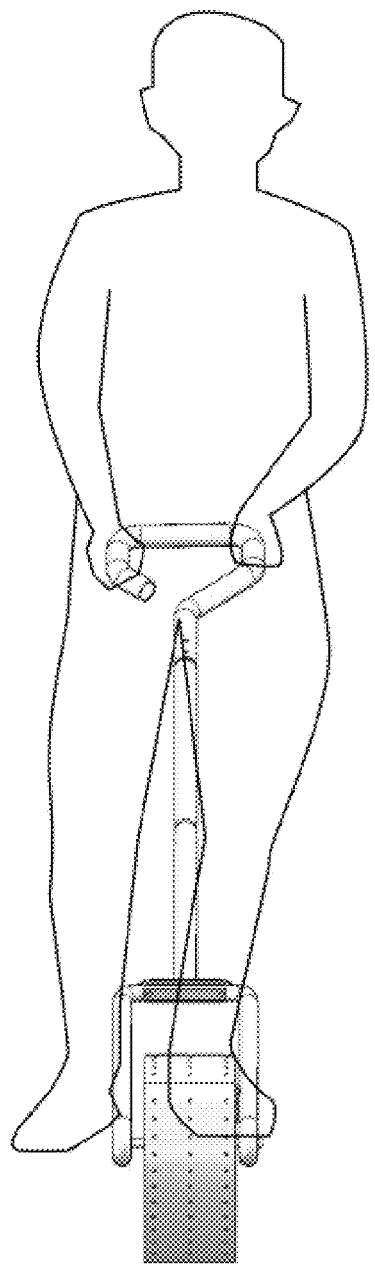
FIG. 15 is a schematic diagram of a second use state of the aerator (punching execution members not shown) according to Embodiment 10 of the present invention.

With reference to FIG. 13 to FIG. 15, for the aerator provided in this embodiment, in an aspect, the punching tool may circularly rotate with an end of the support frame 41 as the pivot point, and in another aspect, may form a stable three-point support with the punching tool, so that the punching tool can independently stand on horizontal ground, thereby facilitating the placement and fetching by a user.

Embodiment 11

Based on Embodiment 9 or 10, a difference lies in the structural form of the handheld member 44.

Figure 16:
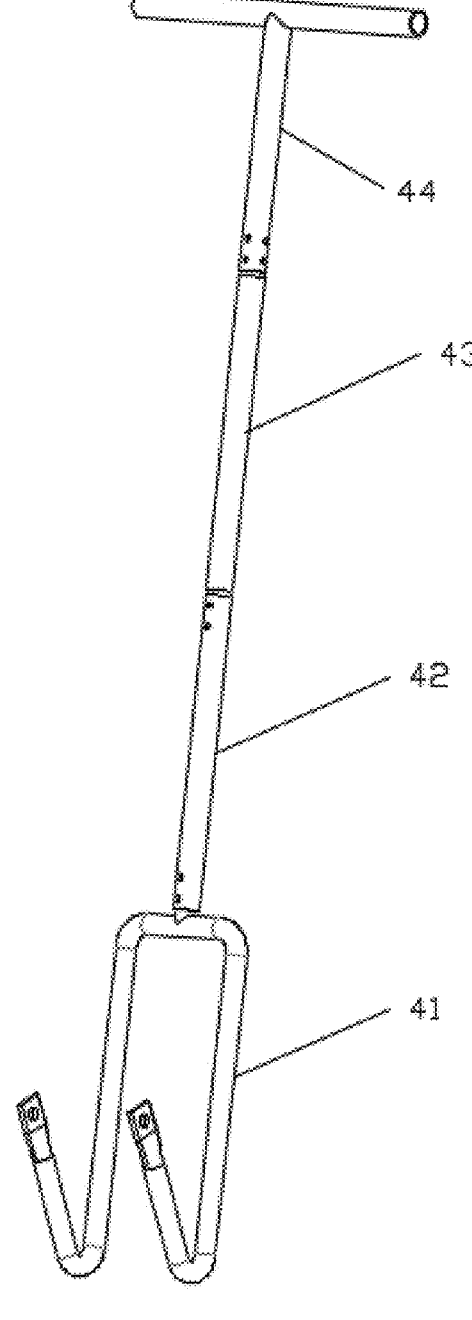
FIG. 16 is a schematic structural diagram of the mounting body according to Embodiment 11 of the present invention.
Figure 17:
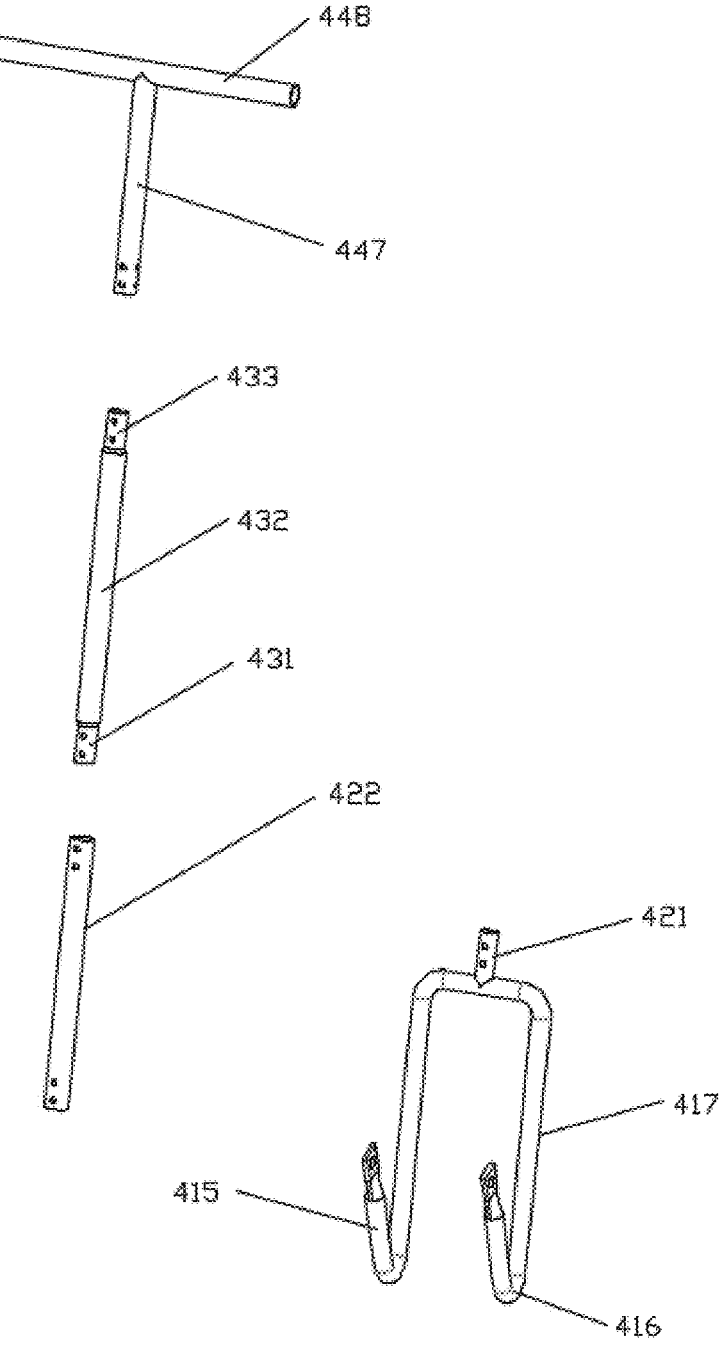
FIG. 17 is an exploded view of a mounting body in FIG. 16.

Specifically, with reference to FIG. 16 and FIG. 17, the handheld member 44 includes a handle portion 447 and a fourth handheld portion 448 that are vertically disposed. The handle portion 447 is connected to the second connecting rod 43. A user holds the fourth handheld portion 448 with both hands for use.

Embodiment 12

Figure 19:
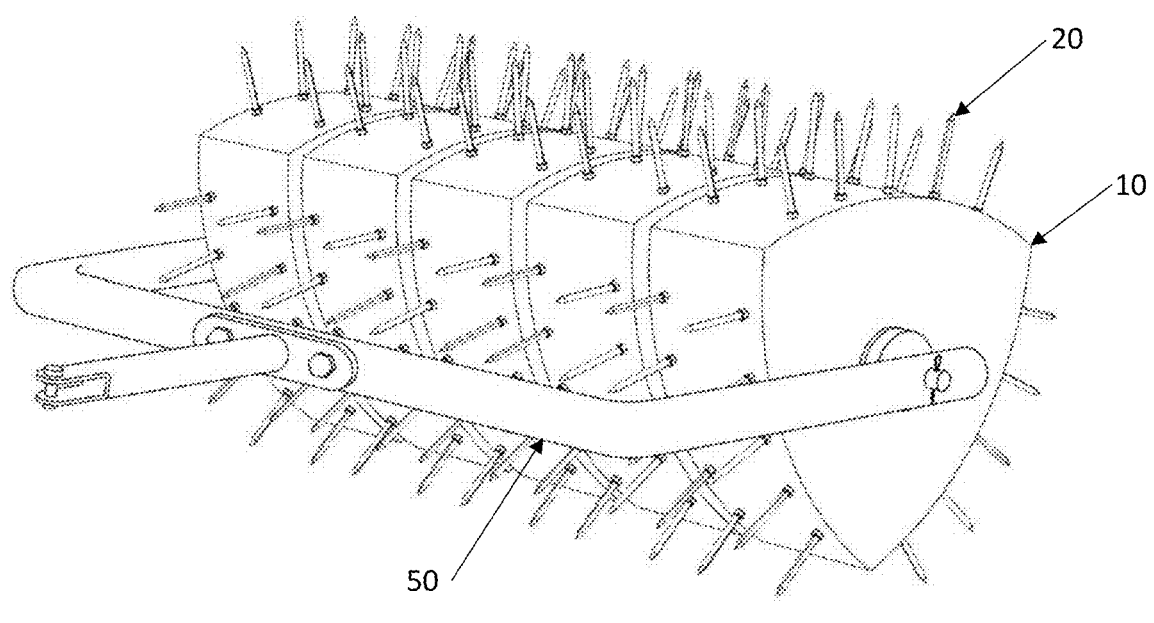
FIG. 19 is a schematic structural diagram of an aerator according to Embodiment 12 of the present invention.

With reference to FIG. 19, an aerator includes a first connecting frame 50 and at least one punching tool provided in any one of Embodiment 1 to Embodiment 8. The punching tool is mounted on the first connecting frame 50.

The first connecting frame 50 may be connected to a power apparatus. The power apparatus is, for example, an electric motor, an internal combustion engine, a hydraulic power source, or an agricultural driving vehicle.

Embodiment 13

A difference from Embodiment 12 lies in the structural form of the connecting frame.

Figure 20:
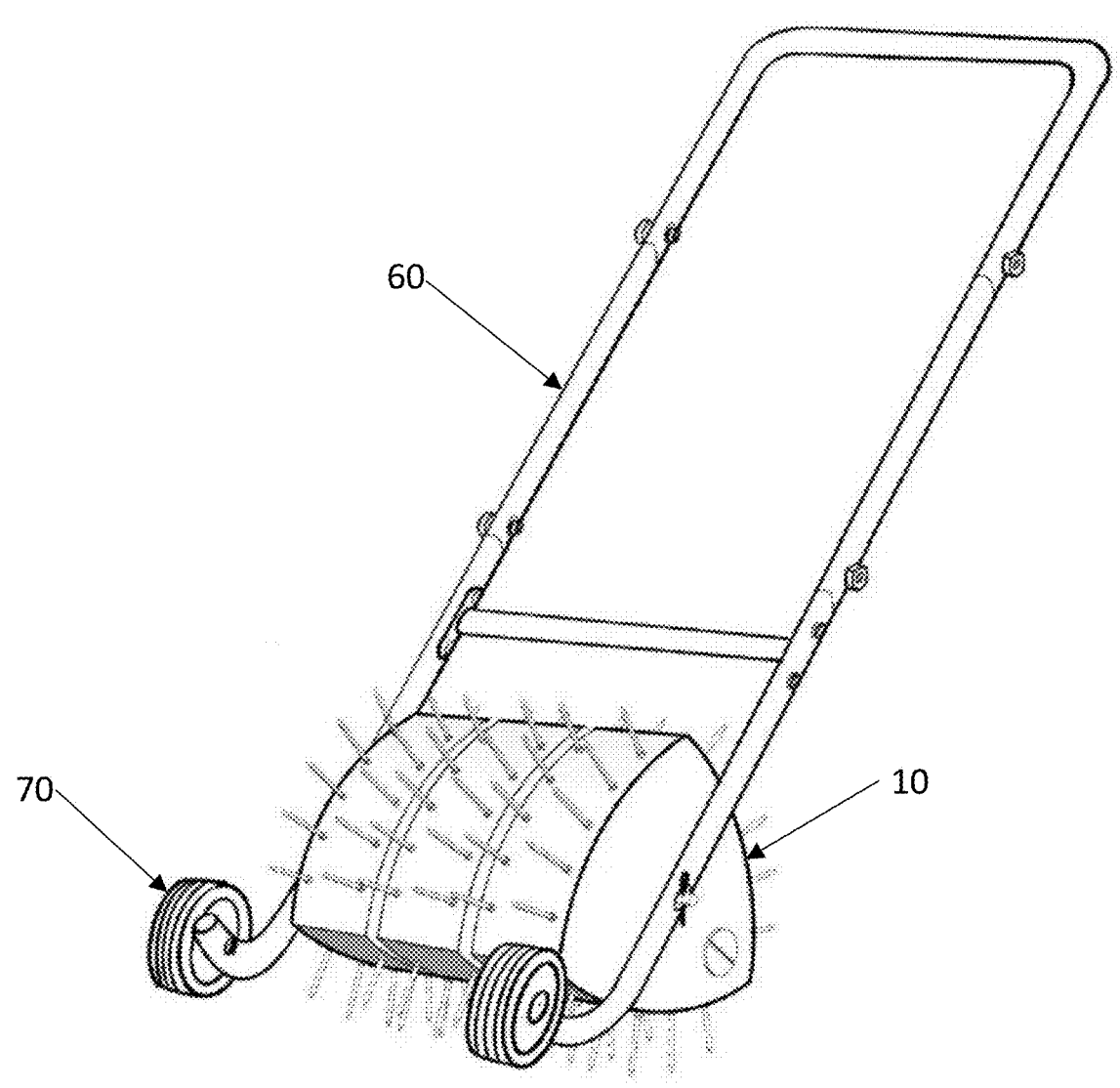
FIG. 20 is a schematic structural diagram of an aerator according to Embodiment 13 of the present invention.

Specifically, as shown in FIG. 20, this embodiment uses a second connecting frame 60. A handle portion of the second connecting frame 60 is U-shaped. A walking member 70 is provided at a position of the second connecting frame 60 that is close to the punching tool. The walking member 70 may be a wheel, assisting in the manipulation of the aerator and the rolling and walking on the ground.

As can be learned from Embodiment 12 and Embodiment 13, it may be selected according to different user requirements to connect a plurality of punching tools in parallel for use, thereby further enhancing the efficiency of aerating lawns.

Test Example

A plot of land with a large area, gentle slope, minimal leaf litter, and no interference from tree fruits or other debris was selected. An existing handheld vertical nail plate, an existing hand-pushed roller with nails, and the aerator provided in Embodiment 8 being equipped with the punching tool in Embodiment 4 to travel 5 m along a straight line. Subsequently, a vernier caliper was employed to conduct a sample test of hole depths. The depths of 10 holes were uniformly sampled along the paths each time. Results are shown in Table 1 below.

TABLE 1

| | Length (mm) of the punching execution members | Average depth (mm) of the holes |
|---|---|---|
| Existing handheld vertical nail plate | 60 | 50.56 |
| Existing hand-pushed roller with nails | Five-pointed star-shaped roller with nails, no fix length | 20.31 |
| Aerator equipped with the punching tool in Embodiment 4 | 60 | 50.30 |

Figure 21:
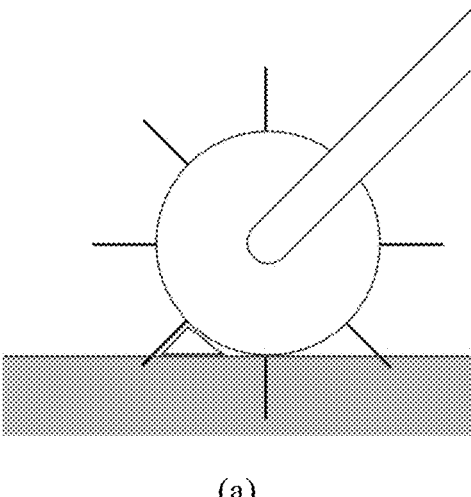
FIG. 21 is a schematic diagram of use comparison between an existing cylindrical punching tool and a punching tool of the present invention.
Figure 21:
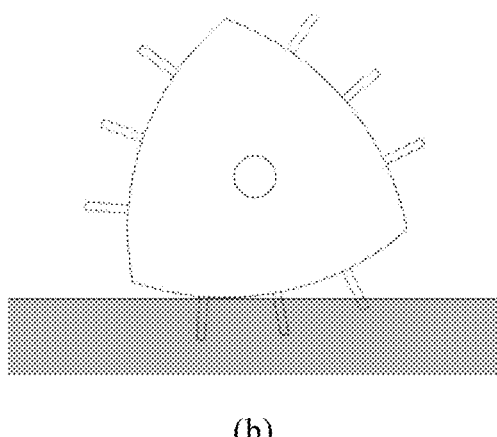

The existing handheld vertical nail plate has a small coverage area, and requires repeated operations, leading to low efficiency. The existing hand-pushed roller with nails is susceptible to nonuniform force bearing due to slight undulations on the ground, and is prone to formation of steady triangles with the ground to cause large resistance and jamming in use, as shown in (a) of FIG. 21, resulting in severe destruction. The aerator equipped with the punching tool provided in the present invention enables angles of the punching execution members 20 being inserted into soil to be closer to 90°, as shown in FIG. 21 (*b*), so that the punching execution members 20 penetrate or exit more smoothly, thereby reducing rolling resistance, and enabling a continuous and uniform process.

In the description of the embodiments of the present invention, it further needs to be noted that unless otherwise expressly specified and defined, the terms "disposed" and "connected" should be understood in a broad sense, for example, fixedly connected, detachably connected, or integrally connected; or mechanically connected, or electrically connected; or connected directly or through an intermediate, or two elements communicated internally. A person of ordinary skill in the art may understand specific meanings of the foregoing terms in the present invention to specific cases.

Clearly, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the scope of protection of the creation of the present invention.

What is claimed is:

1. A punching tool, comprising:
   a bracket;
   an execution body (10), rotatably connected to the bracket by a rotating shaft (31), wherein the execution body is provided with at least two arcuate panels that are disposed around the rotating shaft (31) and are connected end-to-end, and an intersection point of normal lines of any two points on each of the at least two arcuate panels are respectively located at two sides of the rotating shaft (31); and
   a plurality of punching execution members (20), disposed on outer sides of the at least two arcuate panels,
   wherein the execution body (10) is provided with three arcuate panels that are disposed around the rotating shaft and are connected end-to-end; the execution body (10) comprises a group of side plates (11) and a first panel (14), a second panel (15), and a third panel (16) that are disposed between the group of side plates (11); and the first panel (14), the second panel (15), and the third panel (16) are connected end-to-end; and wherein the plurality of punching execution members (20) are arranged on at least one arcuate panel based on preset positions; and the plurality of punching execution members (20) have the same length or different lengths.

2. The punching tool according to claim 1, wherein each of the two arcuate panels is provided with a plurality of rows of punching execution members (20).

3. The punching tool according to claim 2, wherein the plurality of rows of punching execution members (20) are uniformly distributed at intervals on the surface of the at least two arcuate panels.

4. The punching tool according to claim 2, wherein in the plurality of rows of punching execution members (20), a spacing between two adjacent punching execution members (20) at a center of the each of the at least two arcuate panels is less than a spacing between two adjacent punching execution members (20) at an edge of the each of the at least two arcuate panels.

5. The punching tool according to claim 2, wherein in a length direction of the at least two arcuate panels, two end portions of the at least two arcuate panels are not provided with the punching execution members (20).

6. The punching tool according to claim 2, wherein adjacent punching execution members (20) in the plurality of rows of punching execution members (20) are alternately offset in a length or width direction of the at least two arcuate panels.

7. The punching tool according to claim 1, wherein each of the punching execution members (20) extends away from the at least two arcuate panels; and the punching execution member (20) is provided with a tip protruding away from the panel.

8. The punching tool according to claim 1, wherein a counterweight is provided inside the execution body (10).

9. An aerator, comprising:
a mounting body (40), and
the punching tool according to claim 1, connected to the mounting body (40).

10. The aerator according to claim 9, wherein the bracket is a support frame (41); the mounting body (40) comprises at least one connecting rod and a handheld member (44); the support frame (41) is connected to the handheld member (44) by the connecting rod; and the handheld member (44) is configured for a user to hold the handheld member (44) when using the punching tool to perform punching.

11. The aerator according to claim 10, wherein the support frame (41) comprises a first connecting plate (411), a second connecting plate (412), and a third connecting plate (413); the first connecting plate (411) and the second connecting plate (412) are respectively connected to two sides of the third connecting plate (413); and the third connecting plate (413) is connected to the connecting rod.

12. The aerator according to claim 10, wherein the support frame (41) comprises a group of first connecting arms (415), a group of second connecting arms (417), and a fourth connecting plate (418); each of the first connecting arms (415) is connected to one second connecting arm (417) in a bent manner to form a bent portion (416); the second connecting arms (417) are respectively connected to two sides of the fourth connecting plate (418); the fourth connecting plate (418) is connected to the connecting rod; when the connecting rod is perpendicular to a horizontal plane, each bent portion (416) has a contact support point with the horizontal plane.

13. The aerator according to claim 10, wherein the handheld member (44) comprises a third connecting portion (441), a transition portion (442), a first handheld portion (443), a second handheld portion (444), and a third handheld portion (445); the third connecting portion (441) is connected to the connecting rod; the first handheld portion (443) is connected to the third connecting portion (441) in a bent manner by the transition portion (442); and the first handheld portion (443) and the third handheld portion (445) are respectively connected to two sides of the second handheld portion (444), and the first handheld portion (443) and the third handheld portion (445) are disposed in parallel.

14. An aerator, comprising:
a connecting frame; and
at least one punching tool according to claim 1, mounted on the connecting frame.

15. The aerator according to claim 14, wherein the connecting frame is connected to a power apparatus.

*    *    *    *    *